United States Patent
Rus

[11] Patent Number: 6,039,401
[45] Date of Patent: Mar. 21, 2000

[54] SELF-LATCHING AND SELF-RELEASING LATCH MECHANISM FOR REMOVABLE SEAT

[75] Inventor: Liviu Rus, Troy, Mich.

[73] Assignee: Lear Corporation, Southfield, Mich.

[21] Appl. No.: 08/901,729

[22] Filed: Jul. 28, 1997

[51] Int. Cl.[7] .................................................... B60N 2/10
[52] U.S. Cl. ............................. 297/378.13; 296/65.03; 297/331
[58] Field of Search .................................... 297/335, 336, 297/331, 378.13; 296/65.03, 65.01; 248/503.1

[56] References Cited

U.S. PATENT DOCUMENTS

| | | |
|---|---|---|
| 4,759,580 | 7/1988 | Berklich, Jr. et al. . |
| 4,836,597 | 6/1989 | Izumida . |
| 4,865,377 | 9/1989 | Musser et al. ...................... 297/331 X |
| 4,971,379 | 11/1990 | Rumpel . |
| 5,238,285 | 8/1993 | Holdampf et al. . |
| 5,282,662 | 2/1994 | Bolsworth et al. . |
| 5,372,398 | 12/1994 | Aneiros et al. ...................... 296/65.03 |
| 5,482,345 | 1/1996 | Bolsworth et al. . |
| 5,498,051 | 3/1996 | Sponsler et al. ...................... 296/65.03 |
| 5,547,242 | 8/1996 | Dukatz et al. ...................... 296/65.03 |
| 5,562,322 | 10/1996 | Christoffel ...................... 296/65.03 |
| 5,626,391 | 5/1997 | Miller et al. . |
| 5,634,686 | 6/1997 | Okazaki . |
| 5,722,727 | 3/1998 | Unckrich ...................... 297/336 |
| 5,743,596 | 4/1998 | Chabanne ...................... 297/335 X |

FOREIGN PATENT DOCUMENTS

| | | |
|---|---|---|
| 0 781 681 A2 | 7/1997 | European Pat. Off. . |
| 196 07 060 C1 | 4/1997 | Germany . |

OTHER PUBLICATIONS

International Search Report.

Primary Examiner—Peter M. Cuomo
Assistant Examiner—Stephen Vu
Attorney, Agent, or Firm—Brooks & Kushman P.C.

[57] ABSTRACT

A latch mechanism removably attaches a front portion of a collapsible and removable utility seat assembly to a latch rod on a vehicle floor pan. The latch mechanism includes a bracket adapted for attachment to the front portion of the utility seat assembly with a wheel attached thereto. The latch mechanism also includes a locking mechanism connected to the bracket. The locking mechanism includes a lock member rotatably connected to the bracket and adapted for engagement with the floor pan for causing rotation of the lock member with respect to the bracket to facilitate locking of the locking mechanism onto the latch rod as the utility seat assembly is collapsed.

3 Claims, 3 Drawing Sheets

SELF-LATCHING AND SELF-RELEASING LATCH MECHANISM FOR REMOVABLE SEAT

TECHNICAL FIELD

The present invention relates to a latch mechanism for a removable seat, and more particularly to a self-latching and self-releasing latch mechanism for removably attaching a front portion of a collapsible and removable utility seat to a latch rod on a vehicle floor pan.

BACKGROUND OF THE INVENTION

Vehicles such as minivans and large trucks often have removable utility seats in rear compartments which are secured to latch rods on a vehicle floor pan. The seats are removable for allowing storage of cargo in the place of the seat. Such utility seat assemblies are generally provided with a wheel to facilitate rolling of the seat assembly for removal or reattachment of the seat assembly in the vehicle.

It is sometimes desirable to have the capability of collapsing the rear utility seat forward to increase the cargo space in the extreme rear portion of the vehicle. However, when the utility seat assembly is collapsed forward, it is necessary that the seat assembly be properly locked to the floor pan to prevent bouncing of the collapsed seat in the vehicle.

Such removable utility seat assemblies are typically cumbersome and difficult to handle. Because of the bulkiness and weight of the assembly, it is desirable that latching mechanisms be provided for securing the seat assembly to the floor pan in a manner which is easy to handle and repeatable without unwanted disengagement. It is further desirable to provide a latching mechanism for the front portion of the seat assembly which cooperates with the wheel and with the floor pan for automatically locking and unlocking the front portion of the seat assembly to the floor pan as the seat assembly is pivoted between collapsed and use positions.

Accordingly, it is desirable that the seat assembly be automatically locked to the floor pan when in the collapsed position, and that the seat assembly be automatically unlocked for free-wheeling movement when in the upright position to facilitate rolling of the assembly over the floor pan when the rear seat latch is unlatched.

DISCLOSURE OF THE INVENTION

The present invention achieves the functional goals described above with reference to a removable utility seat assembly by providing a seat assembly which automatically locks to the floor pan when in the collapsed position, and which becomes automatically unlocked for free-wheeling movement when in the upright position to facilitate rolling of the assembly over the floor pan when the rear seat latch is unlatched.

More specifically, the present invention provides a latch mechanism for removably attaching a front portion of a collapsible and removable utility seat assembly to a latch rod on a vehicle floor pan. The latch mechanism includes a bracket adapted for attachment to the front portion of the utility seat assembly, with a wheel attached thereto. The latch mechanism further includes a locking mechanism connected to the bracket. The locking mechanism includes a lock member rotatably mounted to the bracket and adapted for engagement with the floor pan for causing rotation of the lock member with respect to the bracket to facilitate locking of the locking mechanism onto the latch rod as the utility seat assembly is collapsed.

In a preferred embodiment, the locking mechanism comprises only a single lock member component which is rotatable with respect to the bracket for locking the latch rod within a slot formed in the bracket. Of course, the locking mechanism could be a multi-component assembly operative to lock onto the latch rod when a lock member component engages the floor pan.

Another aspect of the invention provides a collapsible and removable utility seat assembly for attachment to a vehicle seat floor pan having front and rear latch rods. The assembly includes a pivotable seat bottom frame having front and rear ends. A seat back frame is pivotally connected to the rear end of the seat bottom frame. A rear latch mechanism is connected to the rear end of the seat bottom frame for removably securing the seat bottom frame to the rear latch rod. A self-locking and self-releasing front latch mechanism is connected to the front end of the seat bottom frame. The front latch mechanism includes a bracket attached to the front end of the seat bottom frame and a locking mechanism connected to the bracket. The locking mechanism comprises a lock member rotatably mounted to the bracket and adapted for engagement with the floor pan for causing rotation of the lock member with respect to the bracket to facilitate locking of the locking mechanism onto the latch rod as the utility seat assembly is collapsed.

Accordingly, an object of the present invention is to provide a self-latching, self-releasing latch mechanism for removably attaching a front portion of a collapsible and removable utility seat assembly to a latch rod on a vehicle floor pan.

A further object of the present invention is to provide a locking mechanism for a removable utility seat assembly which automatically locks the seat assembly when the seat assembly is collapsed forward.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
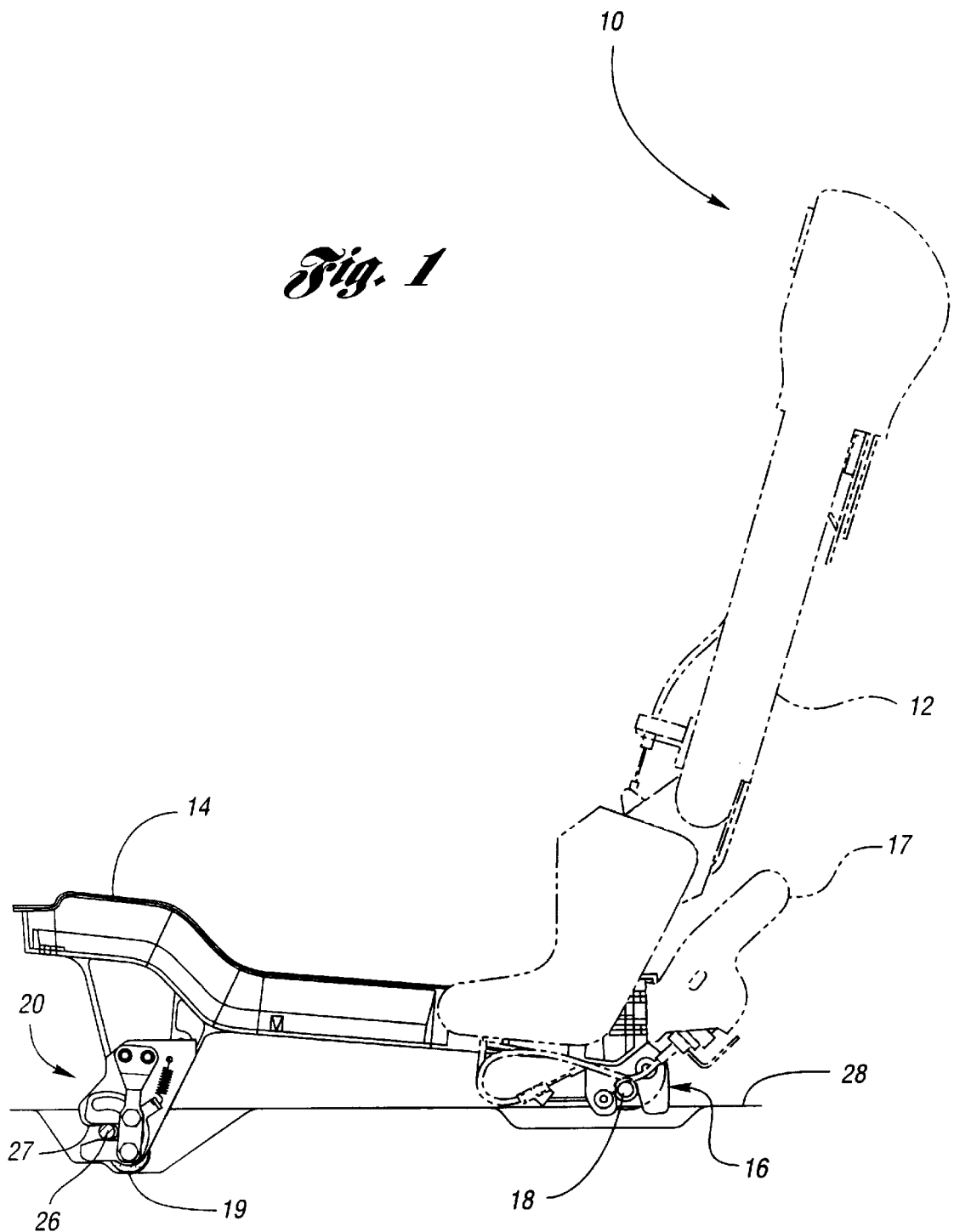
FIG. 1 shows a side view of a rear utility seat assembly in an upright use position in accordance with the present invention.

Referring to FIG. 1, a side view of a rear utility seat assembly in an upright use position is generally shown at 10. The seat assembly 10 includes a pivotal seat back frame 12 which is mounted to a pivotal seat bottom frame 14. The self-latching, manual release rear latch mechanism, generally shown at 16, is mounted to the rear end of the seat bottom frame 14. The rear latch mechanism 16 engages a rear latch rod 18, which is affixed to a vehicle floor pan 28, when the seat assembly 10 is in the upright use position. The rear latch mechanism 16 is provided with a handle 17 for unlocking the rear latch mechanism 16, and for handling the seat assembly 10.

A self-latching, self-releasing front latch mechanism, generally shown at 20, is mounted to a front end of the seat bottom frame 14. The front latch mechanism 20 engages a front latch rod 26 in the U-shaped channel 27 when the seat assembly 10 is in the upright use position. The latch rod 26 is also affixed to the floor pan 28.

A wheel 19 is provided adjacent the front latch mechanism 20 to facilitate rolling of the seat assembly 10 along the vehicle floor pan 28 when the front and rear latch mechanisms 20,16 are unlatched. The handle 17 is useful in manipulating the seat assembly 10 for removal and reattachment of the seat assembly 10 in the vehicle.

Figure 2:
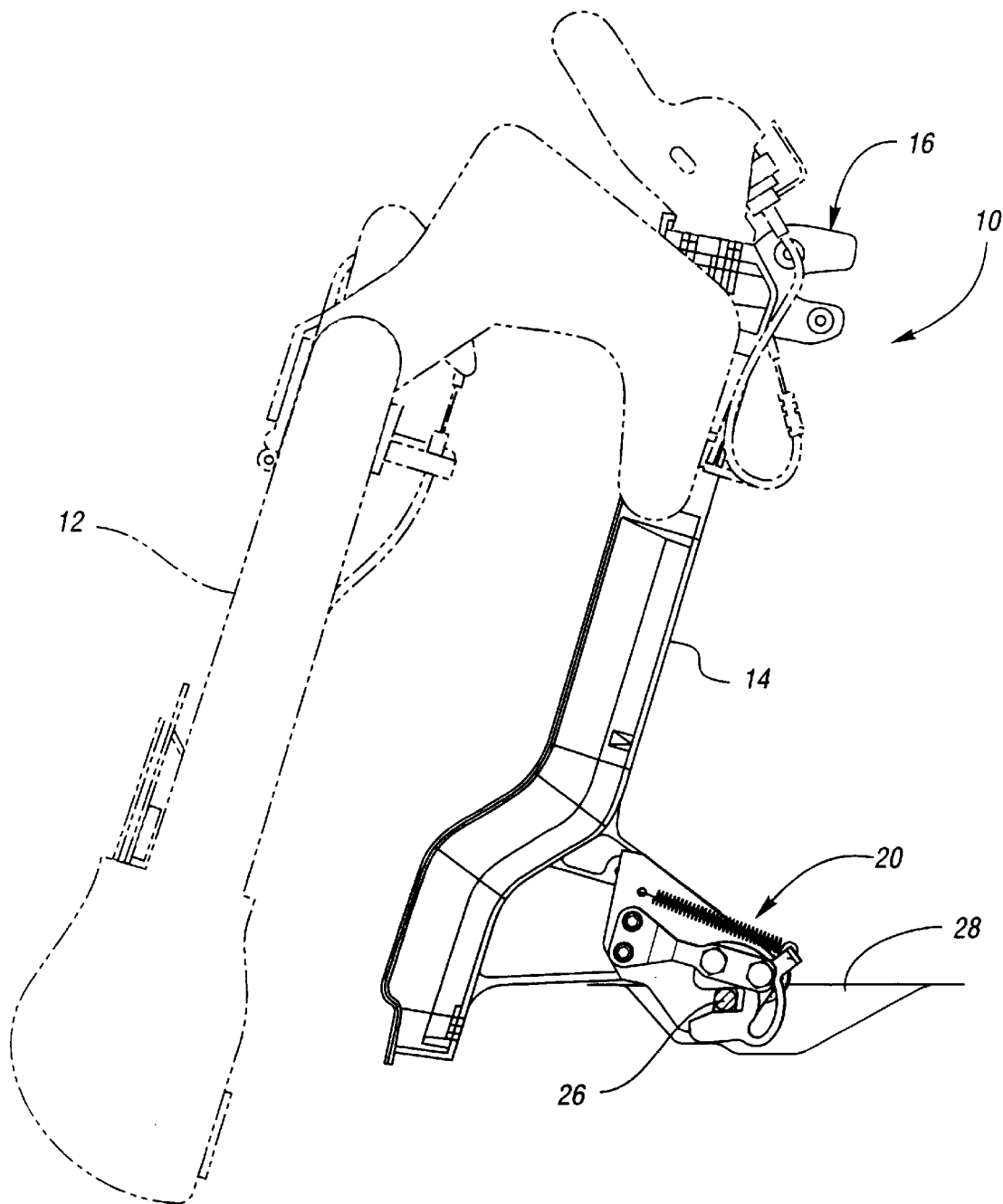
FIG. 2 shows a side view of the seat assembly of FIG. 1 with the seat assembly in the collapsed forward position.

Referring to FIG. 2, a side view of the seat assembly 10 is shown in the collapsed forward, non-use position. In this position, the rear latch mechanism 16 is released and both the seat back frame 12 and the seat bottom frame 14 are folded forward to rest against the floor pan 28. In this position, the extreme rear portion of the vehicle may carry larger cargo because the seat assembly 10 is pivoted out of the rear storage portion.

As the seat assembly 10 is collapsed forward in the vehicle, the front latch mechanism 20 automatically latches the seat assembly 10 in position by rotating counter-clockwise to automatically latch about the latch rod 26 to prevent bouncing of the seat assembly 10 in the vehicle. The details of how the front latch mechanism 20 automatically latches with the latch rod 26 are discussed below.

Figure 3:
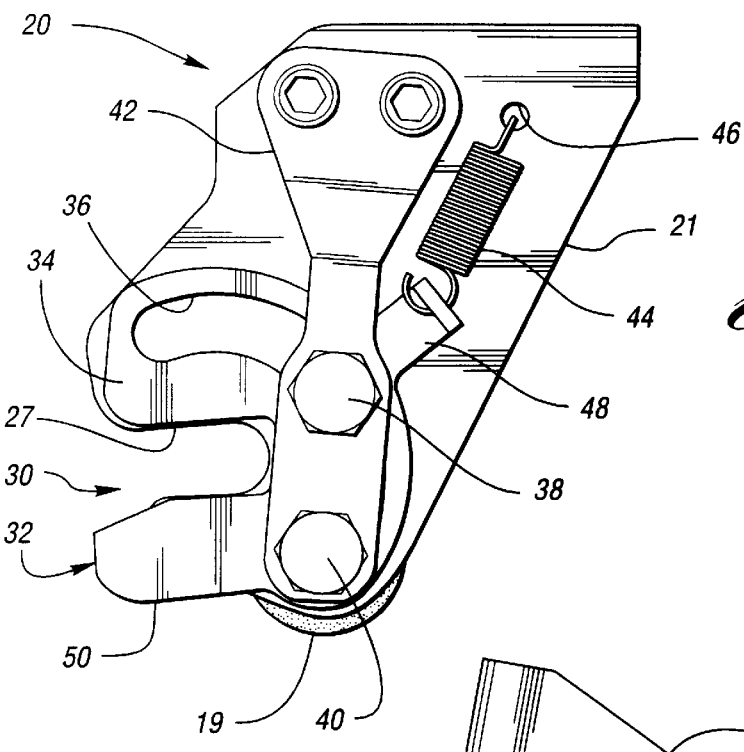
FIG. 3 shows a side view of a front latch mechanism for use with the embodiment shown in FIG. 1.
Figure 4:
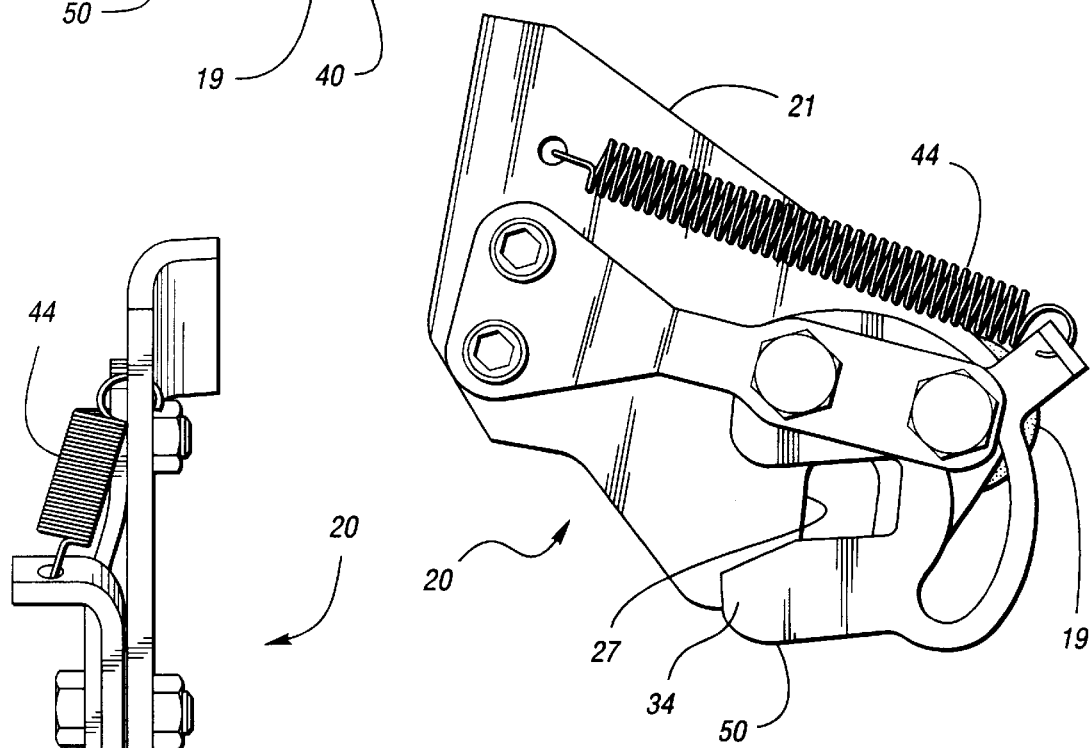
FIG. 4 shows a side view of the latch mechanism shown in FIG. 3 with the latch mechanism in the locked position.
Figure 5:
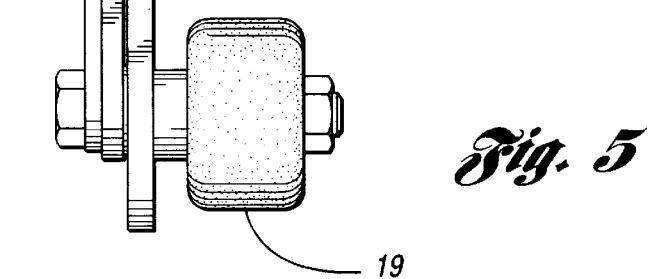
FIG. 5 shows an end view of the latch mechanism shown in FIG. 3.

Referring to FIGS. 3–5, the front latch mechanism 20 is shown in greater detail. FIGS. 3 and 5 show the latch mechanism 20 in the upright use position, and FIG. 4 shows the latch mechanism 20 in the collapsed, locked position. The front latch mechanism 20 includes a locking mechanism 30 connected to the bracket 21. The locking mechanism 30 includes a lock member 32 rotatably mounted to the bracket 21 and adapted for engagement with the floor pan 28 for causing rotation of the lock member 32 with respect to the bracket 21 to facilitate locking of the locking mechanism 30 onto the latch rod 26 as the utility seat assembly is collapsed forward, as shown in FIG. 2.

Preferably, the lock member 32 comprises a single piece, substantially C-shaped component 34 which cooperates with the U-shaped channel 27 formed in the bracket 21 for locking the latch rod 26 therein. The lock member component 34 includes a channel 36 formed therein for cooperation with a pair of studs 38,40, which secure a brace member 42 and the wheel 19 with respect to the bracket 21. The studs 38,40 are slidably received within the channel 36 such that the lock member component 34 is pivotally movable between unlocked and locked positions, as illustrated in FIGS. 3 and 4.

A spring 44 extends between an aperture 46 formed in the bracket and a protrusion 48 extending from the lock member component 34. The spring 44 pivotally biases the lock member component 34 with respect to the bracket 21. The lock member component 34 includes a protruding leg 50 which extends sufficiently for engagement on the floor pan 28 as the seat assembly is collapsed forward for causing rotation of the lock member component 34 with respect to the bracket 21.

When the seat bottom frame 14 is in the use position, as shown in FIG. 1, the lock member component 34 is held in the open position by the spring 44, as shown in FIG. 3. Turning to FIGS. 2 and 4, as the utility seat assembly 10 is collapsed forward in the vehicle, the lock member component 34 is caused to rotate with respect to the bracket 21 against the bias of the spring 44 for locking the front latch rod 26 within the U-shaped channel 27 of the bracket 21. Thus, the front latch mechanism 20 is released or open when the seat bottom frame 14 is not collapsed forward, thereby allowing rolling manipulation of the seat assembly 10 if the rear latch mechanism 16 is unlatched from the rear latch rod 18. When the seat assembly 10 is collapsed forward, the front latch mechanism 20 is operative to secure the front latch rod 26 within the U-shaped channel 27 of the bracket 21, thereby preventing bouncing or disengagement of the collapsed utility seat assembly 10.

At times, it is desirable to remove the seat assembly 10 from the vehicle in order to increase the available cargo space. This can be accomplished by manually releasing the rear latch mechanism 16, tilting the seat assembly 10 slightly up, and with the assistance of the roller 19, rolling the seat assembly rearward in the vehicle. The front latch mechanism 20 simply slides out of engagement with the front latch rod 26 to allow such rolling movement.

In certain applications, it is desirable to pivot the seat assembly forward to create additional cargo space in the rear of the vehicle. Referring to FIG. 2, a side view is shown of the utility seat assembly 10 in such a collapsed, non-use position for creating such additional cargo space. In this position, the front latch mechanism 20 is latched or closed about the front latch rod 26.

When it is desirable to return the seat assembly 10 to the use position, the seat assembly 10 is simply rotated clockwise about the front latch rod 26. As this rotation occurs, the front latch mechanism 20 disengages from the front latch rod 26, and the rear latch mechanism 16 may engage the rear latch rod 18 for securing the seat assembly 10 in the use position.

While the best mode for carrying out the invention has been described in detail, those familiar with the art to which this invention relates will recognize various alternative designs and embodiments for practicing the invention within the scope of the appended claims.

What is claimed is:

1. An apparatus for a vehicle comprising:

a collapsible and removable utility seat assembly having a front portion;

a vehicle floor pan with a latch rod thereon;

a bracket attached to the front portion of the utility seat assembly and having a wheel attached thereto, said bracket having a slot therein for receiving the latch rod; and a locking mechanism connected to the bracket, said locking mechanism including a lock member rotatably mounted to the bracket and said locking mechanism having a forwardly protruding leg extending sufficiently forward for automatic engagement with the floor pan in front of the latch rod as the seat assembly is pivotally collapsed forwardly in the vehicle, such that said engagement of the leg with the floor pan causes relative rotation of the lock member with respect to the bracket to move the lock member to a position securing the latch rod within the slot and preventing vertical movement of the seat assembly away from the floor pan, thereby facilitating automatic self-locking of the locking mechanism onto the latch rod as the utility seat assembly is pivotally collapsed.

2. The apparatus of claim 1, further comprising a spring pivotally biasing said lock member with respect to the bracket.

3. The apparatus of claim 1, further comprising a pair of studs secured to the bracket by a brace member, and wherein said lock member is substantially C-shaped and includes a channel formed therein for slidably receiving the studs.

* * * * *